United States Patent Office 2,714,119
Patented July 26, 1955

2,714,119

PROCESS FOR PREPARING AMIDES OF ALPHA-MERCAPTO LOWER FATTY ACIDS

Nathan N. Crounse, Cincinnati, Ohio, assignor to Sterling Drug Inc., New York, N. Y., a corporation of Delaware No Drawing. Application August 7, 1953,
Serial No. 373,050

10 Claims. (Cl. 260—561)

This invention relates to a novel process for preparing amides of alpha-mercapto lower fatty acids. More particularly, this invention relates to a new process for preparing alpha-mercaptoacetamides and alpha-mercaptopropionamides.

Amides of alpha-mercapto fatty acids are useful for many purposes, for example in the cosmetic, pharmaceutical, and photographic fields. It is known that these compounds can be prepared for example by the ammonolysis of the methyl or ethyl ester of the appropriate alpha-mercapto fatty acid by interacting the ester with ammonia or a primary or secondary amine. However, this process suffers from several drawbacks which render it unsatisfactory, particularly for commercial use, as a method for obtaining these alpha-mercapto fatty acid amides. The most serious of these drawbacks is the extremely unpleasant odor of the ammonolysis product due to the presence of unreacted methyl or ethyl alpha-mercapto fatty acid ester. The presence of a very small quantity of these evil-smelling starting esters as a contaminant of the desired amide is sufficient to render the reaction product undesirably malodorous, and purification of the amide in an attempt to remove the odor of the ester is impractical from an economic standpoint. Another disadvantage of the ammonolysis procedure of the prior art for the preparation of these amides is the extreme slowness of the reaction at the relatively low temperatures, for example 50° C. or below, which are desirable for obtaining optimum yields of the alpha-mercapto fatty acid amides.

It is an object of my invention, therefore, to provide an ammonolysis process for preparing amides of alpha-mercapto lower fatty acids such as mercaptoacetic acid and alpha-mercaptopropionic acid which does not have the above-mentioned drawbacks, that is, a process which affords the desired amides in commercially acceptable condition as to odor and which proceeds without undue difficulty even at relatively low temperatures.

The new process of my invention comprises interacting a 2-(lower alkoxy)ethyl ester of an alpha-mercapto lower fatty acid having 1–8 carbon atoms in the acyl moiety with an ammonolyzing agent, thereby producing the corresponding amide of the alpha-mercapto lower fatty acid. The crude amides thus produced are substantially free from unpleasant odor and in many instances are practically odorless. The reaction proceeds in accordance with the following equation, wherein H—N=B represents the ammonolyzing agent, which is ammonia or a primary or secondary amine:

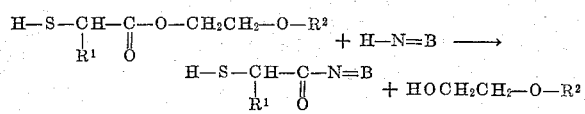

where $R^1$ is hydrogen or lower alkyl and $R^2$ is lower alkyl. By the term "lower alkyl" I mean to indicate alkyl radicals containing 1–4 carbon atoms. In the formula for the ammonolyzing agent H—N=B, the divalent group B can represent two identical or different monovalent groups such as hydrogen; alkyl; substituted alkyl, for example hydroxyalkyl, dialkylaminoalkyl, and aminoalkyl; aryl; aralkyl; or other monovalent radicals; or B can represent a single divalent radical which taken together with the nitrogen atom of the amine forms a ring, for example forming a morpholino, piperidino, pyrrolidino, or similar secondary saturated heterocyclic amine radical.

The ammonolysis reaction is preferably carried out in accordance with my invention by mixing the ammonolyzing agent and a 2-(lower alkoxyethyl) ester of an alpha-mercapto lower fatty acid together in the presence of a polar solvent such as water or an alcohol, for example methanol, ethanol, or preferably, a lower alkoxyethanol such as 2-methoxyethanol or 2-ethoxy-ethanol. In nonpolar hydrocarbon solvents such as benzene or toluene the rate of the ammonolysis reaction is decreased to an undesirable degree, and thus these solvents usually are not employed in the practice of my invention. In general, I prefer to maintain the reaction mixture at a temperature below about 50° C., since the yield of the desired amide tends to be gradually decreased by the use of higher reaction temperatures.

Representative ammonolyzing agents useful in the practice of my invention include ammonia and primary and secondary amines such as methylamine, ethylamine, n-propylamine, dimethylamine, di-n-propylamine, sec.-butylamine, piperidine, morpholine, pyrrolidine, aniline, N-methylaniline, benzylamine, cyclohexylamine, hydrazine, ethanolamine, diethanolamine, N,N-diethylethylenediamine, ethylenediamine, and the like. When ammonia or a gaseous lower aliphatic amine such as methylamine or dimethylamine is employed as the ammonolyzing agent, it is convenient to carry out the reaction by bubbling the ammonolyzing agent into a solution of the ester until the required weight of the ammonia or amine has been absorbed by the reaction mixture.

It is well known that, in the absence of rigorous purification procedures, organic mercapto compounds normally contain small amounts of disulfides. Depending in large degree on the disulfide content of the starting alkoxyethyl ester and the degree of subsequent exposure of the ammonolysis product to the oxidizing influence of air, the alpha-mercapto acid amides produced by my process will contain a small percentage of disulfide products. However, the presence of these disulfides in small amounts does not interfere to any practical degree with the utility of the alpha-mercapto acid amides for most uses, and therefore it is not usually worth-while to remove the disulfide impurities by purification, although such purification can of course be carried out by the usual methods if desired.

The esters employed as starting materials in my process are readily prepared in conventional fashion by esterifying an alpha-mercapto lower fatty acid with a 2-(lower alkoxy)ethanol in the presence of a small amount of a strong mineral acid such as sulfuric acid to serve as an esterification catalyst. In general, I prefer to employ the 2-(lower alkoxy)ethyl esters in which the alkoxy group contains 1–4 carbon atoms. Moreover, for reasons of economy and ease of separation of the alkoxyethanol produced as a by-product in the ammonolysis reaction, I particularly prefer to employ the 2-methoxyethyl or 2-ethoxyethyl esters of the alpha-mercapto lower fatty acid as the starting materials.

It will be appreciated that the alpha-mercapto lower fatty acid amides obtained by my new process can if desired be readily converted in conventional fashion, either before or after purification, to mercaptide salts by treatment with alkaline reagents such as ammonia, amines or alkali metals. In general, such mercaptides will be found to be the most useful form of the products, being more soluble and more stable than the alpha-mercapto lower fatty acid amides themselves.

My invention is illustrated by the following examples without, however, being limited thereto.

EXAMPLE 1
*Alpha-mercaptoacetamide*
H—S—CH$_2$—CONH$_2$

A mixture of 306 g. of 90.4% mercaptoacetic acid, 291 g. of 2-methoxyethanol, 5 ml. of 95% sulfuric acid, and 415 g. of benzene was heated to reflux, using a condenser with a water trap. The mixture was heated until 80 ml. of liquid consisting of 25% 2-methoxyethanol and 75% water had been collected in the trap. The reaction mixture was then cooled and washed with 150 ml. of water containing 15 g. of sodium bicarbonate dissolved therein. The mixture was then washed with 150 ml. of water and placed in a distillation flask. All of the benzene was removed from the mixture by distillation at atmospheric pressure up to a temperature of 135° C. The distillation residue was then cooled to 50° C. and held at reduced pressure (20 mm. pressure) for about one hour. The product thus obtained weighed 475 g. and contained 91.6% of the desired 2-methoxyethyl mercaptoacetate.

389 g. of methoxyethyl mercaptoacetate obtained as described above was dissolved in 45 g. of 2-methoxyethanol and placed in a one-liter, three-neck flask fitted with a thermometer, stirrer, and gas inlet and outlet. Ammonia was bubbled through the solution at 15–17° C. until the weight of the reaction mixture had increased by 98 g. The reaction mixture was then stirred for one hour more and placed in the refrigerator overnight. The white solid which separated from the reaction mixture was collected on a filter. This product, which was the ammonium salt of alpha-mercaptoacetamide, weighed 236 g. 2-ethoxyethanol can be employed in place of 2-methoxyethanol as the solvent in the above example to yield substantially the same results.

EXAMPLE 2
*Alpha-mercapto-N,N-dimethylacetamide*
H—S—CH$_2$—CO—N(CH$_3$)$_2$ 151.2 g. of 2-methoxyethyl mercaptoacetate and 38 g. of 2-methoxyethanol were placed in a 250 ml. round-bottomed flask and dimethylamine was bubbled through the solution while agitating and cooling the solution in an ice bath. When 45 g. of dimethylamine had been absorbed, the reaction mixture was stored at 49° C. for three days. The reaction mixture was then distilled under reduced pressure to yield 38.8 g. of product having the appearance and viscosity of glycerol and containing 92.3% of alpha-mercapto-N,N-dimethylacetamide having the structure H—S—CH$_2$—CO—N(CH$_3$)$_2$. The reaction product contained 5.7% of disulfide calculated as sulfhydryl. The specific gravity of the product was 1.1325 g./ml.

EXAMPLE 3
*Alpha-mercapto-N-methylacetamide*
H—S—CH$_2$—CO—NH—CH$_3$

Proceeding in the manner described above in Example 2, but employing methylamine instead of dimethylamine, there is obtained, as the product of the interaction of the amine with 2-methoxyethyl mercaptoacetate, the compound alpha-mercapto-N-methylacetamide.

EXAMPLE 4
*Alpha-mercapto-N-(2-hydroxyethyl)-acetamide*
H—S—CH$_2$—CO—NH—CH$_2$CH$_2$OH 150 g. of 2-methoxyethyl mercaptoacetate and 38 g. of 2-methoxyethanol were placed in a 500 ml. round-bottomed flask fitted with a stirrer, thermometer, nitrogen inlet, gas outlet tube with a mercury trap and a dropping funnel. 61 g. of monoethanolamine was added to the mixture with stirring at a temperature of 40–45° C. during a period of ten minutes. After the reaction mixture had stood for one and one-half hours following completion of the addition of the amine, it was found that the reaction product contained 92% of alpha-mercapto-N-(2-hydroxyethyl)-acetamide.

Ammonia was bubbled into the product obtained as described above through a glass tube with a fritted end, the reaction mixture being maintained at a temperature of 50° C. during the addition of the ammonia. Crystallization of solid from the mixture occurred spontaneously (in other instances crystallization was induced by seeding or by the addition of a small quantity of carbon tetrachloride) a considerable amount of heat was liberated during the crystallization process. The reaction product was collected on a filter under an atmosphere of nitrogen. The colorless crystalline solid thus obtained, which consisted of ammonium alpha-mercapto-N-(2-hydroxyethyl)-acetamide, was washed with 250 ml. of carbon tetrachloride to remove unreacted monoethanolamine and residual methoxyethanol under an atmosphere of nitrogen. The product was soluble in water.

EXAMPLE 5
*Alpha-mercaptopropiohydrazide*
H—S—CH(CH$_3$)—CO—NH—NH$_2$ 44.7 g. of 2-methoxyethyl alpha-mercaptopropionate was dissolved in 100 ml. of methanol in a 500 ml. round-bottomed flask. To the solution there was added 15.0 g. of hydrazine hydrate while cooling to maintain the reaction mixture at a temperature near 25° C. The reaction flask was then closed and the mixture was allowed to remain at room temperature (about 25° C.) for several days. The reaction product was then heated under reduced pressure to distill off undesired volatile material, the flask finally being heated to 120° C. in an oil bath. The residue in the flask weighed 30.5 g. and consisted of 88.3% of alpha-mercaptopropiohydrazide and 5.0% of disulfide calculated as sulfhydryl.

EXAMPLE 6
*Alpha-mercaptopropionamide*
H—S—CH(CH$_3$)—CONH$_2$ 164.2 g. of 2-methoxyethyl alpha-mercaptopropionate and 41 g. of 2-methoxyethanol were placed in a 250 ml. round-bottomed flask. Ammonia was bubbled through the solution at a moderate rate with agitation and cooling in an ice bath. When 34 g. of ammonia had been absorbed by the solution, the reaction mixture was stored for several days at 10° C. Alpha-mercaptopropionamide separated from the solution in the form of its addition salt with one mole of ammonia in the form of pure white solid. This solid was collected on a filter under an atmosphere of nitrogen, washed with peroxide-free ether, and dried under an atmosphere of nitrogen. The product weighed 102.6 g. and consisted of 85.8% of ammonium alpha-mercaptopropionamide and 7.4% of disulfide calculated as sulfhydryl.

EXAMPLE 7
*Alpha-mercapto-N-(2-diethylaminoethyl)acetamide*
H—S—CH$_2$—CO—NH—CH$_2$CH$_2$—N(C$_2$H$_5$)$_2$ 150 g. of 2-methoxyethyl mercaptoacetate and 38 g. of 2-methoxyethanol were placed in a three-neck 500 ml. round bottomed flask fitted with a stirrer, separatory funnel and a condenser through which was suspended a thermometer. 116.2 g. of N,N-diethylethylenediamine was added dropwise to the solution with stirring over a period of one hour. The temperature of the reaction mixture was maintained below 45° C. with periodic cooling as required, and the yellow-colored solution was stirred for fifteen minutes after addition of the amine was completed. The reaction flask was then closed and stored at 10° C. for three weeks. The mixture was then distilled under reduced pressure to yield a fraction boiling at 125–

130° C. at 3 mm. pressure which consisted largely of alpha-mercapto-N-(2-diethylaminoethyl)-acetamide.

EXAMPLE 8

*N,N'-bis(mercaptoacetyl)ethylenediamine*

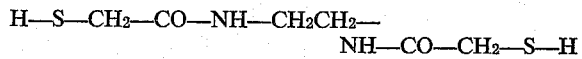

200 g. of 2-methoxyethyl mercaptoacetate and 500 g. of 2-methoxyethanol were placed in a three-neck 500 ml. round-bottomed flask fitted with a stirrer, separatory funnel and a condenser through which was suspended a thermometer. To this solution there was added dropwise with stirring 40 g. of ethylenediamine over a period of one-half hour. The temperature of the reaction mixture was maintained below 45° C. with periodic cooling as required, and the colorless reaction mixture was stirred for one-half hour after addition of the amine was completed. The reaction flask was then closed and stored at 10° C. for two days. The white crystals which separated from the reaction mixture were collected on a filter and dried under an atmosphere of nitrogen. There was thus obtained 93.8 g. of N,N'-bis(mercaptoacetyl)-ethylenediamine containing a small amount of disulfide.

The above product was converted into an addition product with ammonia in the following manner. 30 g. of N,N'-bis(mercaptoacetyl)ethylenediamine was dissolved in 78 g. of 2-methoxyethanol and ammonia was bubbled through the solution, thus causing a mildly exothermic reaction to take place. When ammoniation was completed, the flask was closed and stored at −1° C. for four days. The white solid which crystallized from the solution, which consisted of ammonium N,N'-bis(mercaptoacetyl)ethylenediamine, was collected on a filter and dried under an atmosphere of nitrogen.

The alpha-mercapto lower fatty acid amides produced in accordance with the above examples were found in each instance to be substantially free from unpleasant odor, in sharp contrast with the malodorous reaction products obtained by preparing these amides by the known ammonolysis procedures.

On standing, for example for twenty-four hours or longer, alpha-mercapto fatty acid amides usually develop an odor of hydrogen sulfide due to the slow decomposition of the amide. However, this decomposition can be retarded considerably by storage at low temperature or conversion to a more stable compound, such as ammonium salt, or both. In any event, this later development of the hydrogen sulfide odor is inherent in the chemical properties of the alpha-mercapto fatty acid amides and is not related to the advantage afforded by my new process in providing the desired amides substantially free from unpleasant odor.

I claim:

1. The process for preparing an amide of an alpha-mercapto lower fatty acid which comprises ammonolyzing a 2-(lower alkoxy)ethyl ester of the said alpha-mercapto lower fatty acid with an agent of the class consisting of ammonia, hydrazine, and primary and secondary amines.

2. The process for preparing alpha-mercaptoacetamide which comprises ammonolyzing a 2-(lower alkoxy)ethyl mercaptoacetate with ammonia.

3. The process for preparing alpha-mercaptoacetamide which comprises ammonolyzing 2-methoxyethyl mercaptoacetate with ammonia.

4. The process for preparing alpha-mercaptoacetohydrazide which comprises ammonolyzing 2-methoxyethyl mercaptoacetate with hydrazine.

5. The process for preparing an alpha-mercapto-N-monoalkylacetamide which comprises ammonolyzing 2-methoxyethyl mercaptoacetate with a monoalkylamine.

6. The process for preparing an alpha-mercapto-N,N-dialkylacetamide which comprises ammonolyzing 2-methoxyethyl mercaptoacetate with a dialkylamine.

7. The process for preparing alpha-mercapto-N,N-dimethylacetamide which comprises ammonolyzing 2-methoxyethyl mercaptoacetate with dimethylamine.

8. The process for preparing alpha-mercaptopropionamide which comprises ammonolyzing a 2-(lower alkoxy)-ethyl alpha-mercaptopropionate with ammonia.

9. The process for preparing alpha-mercaptopropionamide which comprises ammonolyzing 2-methoxyethyl alpha-mercaptopropionate with ammonia.

10. The process for preparing alpha-mercaptopropiohydrazide which comprises ammonolyzing 2-methoxyethyl alpha-mercaptopropionate with hydrazine.

No references cited.